(12) United States Patent
Waser et al.

(10) Patent No.: US 7,789,559 B2
(45) Date of Patent: Sep. 7, 2010

(54) TEMPERATURE SENSOR WITH PROCESSABLE FRONT

(75) Inventors: Max Waser, Hittnau (CH); Ernst Pletscher, Marthalen (CH)

(73) Assignee: Kistler Holding AG, Winterthur (CH)

( * ) Notice: Subject to any disclaimer, the term of this patent is extended or adjusted under 35 U.S.C. 154(b) by 193 days.

(21) Appl. No.: 11/850,216

(22) Filed: Sep. 5, 2007

(65) Prior Publication Data

US 2008/0080589 A1    Apr. 3, 2008

(30) Foreign Application Priority Data

Sep. 6, 2006    (CH)    .................................... 1424/06

(51) Int. Cl.
  *G01K 7/02*    (2006.01)
  *G01K 1/00*    (2006.01)
(52) U.S. Cl. .................. 374/179; 374/208; 374/163; 136/200
(58) Field of Classification Search .................. 374/100, 374/159, 163, 183, 179, 185, 208; 73/866.5; 136/200
See application file for complete search history.

(56) References Cited

U.S. PATENT DOCUMENTS

| 1,979,085 | A | * | 10/1934 | Vollrath | ...................... | 136/235 |
|---|---|---|---|---|---|---|
| 2,422,124 | A | * | 6/1947 | Obermaier | ................... | 136/221 |
| 2,838,935 | A | * | 6/1958 | Di Cecio et al. | .............. | 338/28 |
| 3,317,353 | A | * | 5/1967 | Bingham | ..................... | 136/233 |
| 3,725,134 | A | * | 4/1973 | Gessner et al. | ............... | 136/234 |
| 3,776,039 | A | * | 12/1973 | Bowen | ........................ | 374/147 |
| 3,867,205 | A | * | 2/1975 | Schley | ......................... | 136/232 |
| 4,251,908 | A |  | 2/1981 | Carr |  |  |
| 4,385,197 | A | * | 5/1983 | Schwagerman | ............. | 136/221 |
| 4,595,300 | A | * | 6/1986 | Kaufman | ..................... | 374/170 |
| 4,614,635 | A | * | 9/1986 | Terhune | ....................... | 376/154 |
| 4,663,811 | A | * | 5/1987 | Gellert | .................. | 29/890.142 |
| 4,963,194 | A | * | 10/1990 | Mele | ............................ | 136/221 |
| 5,697,706 | A | * | 12/1997 | Ciaravino et al. | ........... | 374/166 |
| 5,716,133 | A | * | 2/1998 | Hosokawa et al. | .......... | 374/121 |
| 5,812,588 | A | * | 9/1998 | Deak et al. | .................... | 374/166 |
| 6,106,148 | A | * | 8/2000 | Moslehi et al. | ................. | 374/1 |
| 6,193,414 | B1 | * | 2/2001 | Balzano | ....................... | 374/208 |
| 6,299,349 | B1 | * | 10/2001 | Steinel et al. | ............... | 374/143 |
| 7,004,626 | B1 | * | 2/2006 | Giberson et al. | ............ | 374/179 |
| 7,465,086 | B1 | * | 12/2008 | Foreman, Jr. | ............... | 374/143 |
| 2006/0104331 | A1 |  | 5/2006 | Dreher et al. |  |  |
| 2006/0165153 | A1 | * | 7/2006 | Tillman et al. | .............. | 374/208 |

(Continued)

FOREIGN PATENT DOCUMENTS

DE    19709609    3/1997

OTHER PUBLICATIONS

CH 14242006—Search Report, Publication Date: Sep. 6, 2006.

*Primary Examiner*—Gail Verbitsky
(74) *Attorney, Agent, or Firm*—Dority & Manning, P.A.

(57) ABSTRACT

A temperature sensor has a sensor tip and a front for measuring the temperature of the inner walls of tools, particularly inner walls of injection molding tools. The tip of the temperature sensor has two thermocouple wires of a thermocouple. Each thermocouple wire of the thermocouple guided to the front is welded to the sensor tip up to a depth which is larger than the total processing depth behind the front. The sensor tip is processable by removing of material at the front up to that processing depth.

14 Claims, 1 Drawing Sheet

U.S. PATENT DOCUMENTS

2007/0258506 A1* 11/2007 Schwagerman et al. ..... 374/179
2007/0290054 A1* 12/2007 Knapp ....................... 236/12.2
2008/0205483 A1* 8/2008 Rempe et al. ................ 374/179
2010/0101553 A1* 4/2010 Dotti et al. .................... 126/58

* cited by examiner

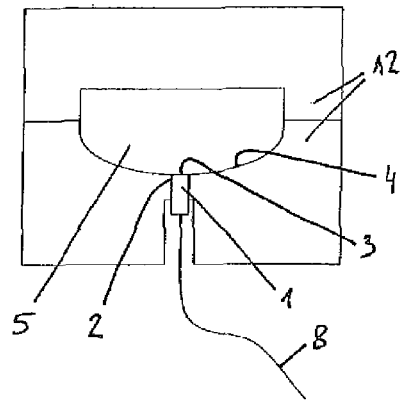 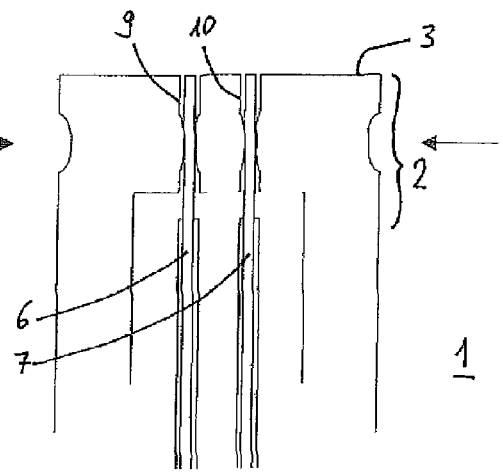
Fig. 1
Fig. 2
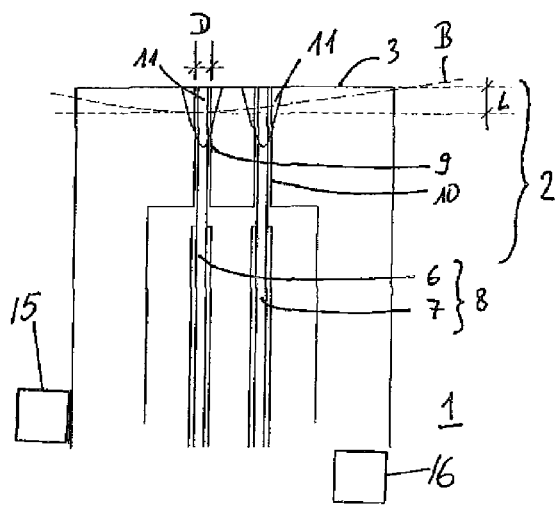 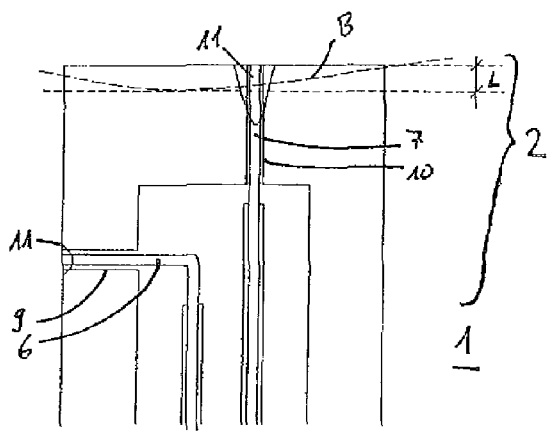
Fig. 3
Fig. 4

TEMPERATURE SENSOR WITH PROCESSABLE FRONT

CROSS-REFERENCE TO RELATED APPLICATIONS

This application claims priority to Swiss Application No. 01424/06, filed Sep. 6, 2006.

TECHNICAL FIELD

The invention relates to a temperature sensor having a sensor tip and a front for measuring the temperature of the inner walls of tools, particularly the inner walls of injection molding tools, wherein the sensor tip is processable by removing material at the front up to a processing depth.

PRIOR ART

Temperature sensors for measuring the temperature of tool inner walls of injection molding tools are known. They are used to control injection molding processes and are also available as combined pressure-temperature sensors. Usually, thermocouples are used for these applications because they have a much shorter response time compared to temperature sensors. Thermocouples are made of two thermocouple wires of different materials. In one thermocouple of the K type, for example, one of the thermocouple wires is made of nickel-chromium while the other is made of nickel. The response time of a thermocouple depends on the mass of the junction point connecting the two thermocouple wires.

Since the fronts of these sensors form part of the inner surface of the tool their outlines are visible on the injection-molded parts. In particular, any unevenness, ledges or fissures towards the bores in the tools into which such sensors are inserted are reproduced on the parts, a fact which is judged as a defect.

Generally, the fronts of pressure sensors can be processed. Into a bore having as little play as possible a sensor of this type is inserted up to a sufficient depth that it reaches on all sides at least the edge of the cavity. Afterwards, the sensor front is processed by removing material until the front is planar with the adjacent inner wall of the cavity.

For this application, temperature sensors which have a processable front are also available. A sensor of this type is described in WO 2004/052613. FIG. 2 shows a schematic representation of a cross-section of a sensor tip 2 according to the prior art as described in WO 2004/052613. Two thermocouple wires 6, 7 are inserted in two bores 9, 10 at the front 3 of the sensor tip 2 and connected to the sensor tip 2 by crimping in the area of these bores 9, 10. This temperature sensor is crimped (compressed) in the front region so that the individual thermocouple wires of the thermocouple are in close contact with the surrounding sensor tip. The area between the arrows in FIG. 2 represents the crimping area. This process allows for subsequent processing of the front 3 by the user. This is required for a reliable measurement of the thermocouple. The external region of the sensor tip, however, is damaged by the compressing during crimping which adversely affects a smooth fitting into the bore. The damage to the external region of the sensor tip done by compressing during crimping adversely affects the ability to insert the tip into the bore of the tool as smoothly as otherwise would be possible.

OBJECTS AND SUMMARY OF THE INVENTION

Therefore, it is an object of the present invention to suggest a temperature sensor with a processable front of the type mentioned in the beginning, said sensor having no mechanical damage in the external region of the sensor tip.

The object has been achieved by the features of the independent claim. Further preferred embodiments are obvious from the dependent claims.

The idea underlying the present invention is that in the temperature sensor according to the invention each thermocouple wire of a thermocouple guided to the front is welded to the sensor tip up to a depth which is larger than the total processing depth behind the front 3.

BRIEF DESCRIPTION OF THE DRAWINGS

In the following, the invention will be explained in more detail with respect to the drawings which show:

FIG. 1 a schematic sectional representation of an injection molding tool with an integral temperature sensor;

FIG. 2 a schematic representation of a cross-section of a sensor tip according to the prior art;

FIG. 3 a schematic representation of a cross-section of a sensor tip according to the invention;

FIG. 4 a schematic representation of a cross-section of an alternative embodiment of a sensor tip according to the invention.

DETAILED DESCRIPTION OF THE EMBODIMENTS

FIG. 1 shows the sensor claimed in a typical integral state. The Figure shows a schematic sectional representation of a bipartite injection molding tool 12 having a tool inner wall 4 surrounding a cavity 5. Adjacent to this tool inner wall 4 there is integrated a sensor 1 with a thermocouple 8 comprising a sensor tip 2 against the front 3 of which abuts the tool inner wall 4.

The invention describes a temperature sensor 1 having a sensor tip 2 and a front surface 3 for measuring the temperature of tool inner walls 4, particularly of injection molding tool inner walls 12, with two thermocouple wires 6, 7 of a thermocouple 8 wherein the sensor tip 2 is processable by removing of material at the front surface 3 up to a total processing depth L. The idea underlying the invention is that in the temperature sensor 1 according to the invention, each thermocouple wire 6, 7 of the thermocouple 8 guided to the front surface 3 is welded to the sensor tip 2 up to a depth which is larger than the total processing depth L behind the front surface 3.

FIG. 3 shows a schematic representation of a cross-section of a sensor tip 2 according to the invention of a temperature sensor 1. Typically, the sensor tip 2 is made of a suitable steel. The reference numerals are the same in all Figures. Thus, also this sensor tip 2 comprises two bores 9, 10 in which two thermocouple wires 6, 7 of a thermocouple 8 are guided to the front surface 3 of the sensor tip 2. A temperature sensor of this type is suitable for measuring the temperatures of tool inner walls 4, particularly of the inner walls of injection molding tools. According to the invention, each of the thermocouple wires 6, 7 guided to the front surface 3 is welded to the sensor tip 2 in a welding area 11 up to a depth which is higher than the total processing depth L behind the front surface 3. Due to this deep and safe welding 11 the sensor tip 2 can be processed for subsequent fitting of the front surface 3 to the tool inner wall 4 by removing of material at the front surface 3 up to the processing depth L. The dotted line B represents an example of a new front surface after the processing. Even after material has been removed at the front surface 3 up to the processing depth L the remaining welding area 11 between each of the thermocouple wires 6, 7 at the sensor tip 2 is sufficiently large to ensure the required connection of the thermocouple wires 6, 7 to the sensor tip 2. In this way the correct temperature measurement of the thermocouple 8 can be guaranteed.

Preferably, the two thermocouple wires 6, 7 as represented in FIG. 3 are guided to the front 3. FIG. 4 shows an alternative embodiment of a sensor 1 according to the invention wherein only one thermocouple wire 7 is guided to the front surface 3 while the other thermocouple wire 6 is for example guided laterally towards the surface of the sensor tip 2. In this configuration the sensor tip 2 is preferably made of the same material as the thermocouple wire 6 which does not lead until the front surface 3, that is for example of a nickel-chromium alloy or nickel if a thermocouple 8 of the K type is used. Thereby the response time is shortened because the two materials of the thermocouple wires 6, 7 are adjoined in a welding area 11 at the front surface 3. A welding 11 at this site only requires a good connection to the sensor tip. An additional depth of the welding is not necessary since no material has to be removed at this site.

The weldings 11 at the front surface 3 of the sensor tip 2 of FIGS. 3 and 4 are preferably performed individually at every thermocouple wire 6, 7. In particular in the case of small sensors 1 it is very difficult to carry out the welding because these sensors can easily be damaged during welding due to overheating. Usually, the distances of the thermocouple wires 6, 7 regarding their centers are about 0.5 mm while the thickness of the front surface 3 is for example about 1-4 mm. Typically, the diameters of the thermocouple wires 6, 7 are between 0.1 and 0.2 mm.

The processing depth L is at least 0.2 mm, preferably at least 0.5 mm thick. In most cases, this thickness is sufficient to adapt the front surface 3 to the required outline of the tool inner wall 4.

The weldings are performed without any addition of material. In this way it can be avoided that the front surface 3 has to be processed after the welding what would result in additional efforts. Preferably, the thermocouple wires are welded by means of electron beam welding or laser beam welding. Since electron beam welding generates less heat and deeper welding can be performed without overheating the workpiece this method is preferred.

The best results can be achieved if the radial clearance of the thermocouple wires 6, 7 in the bores 9, 10 is at a minimum. With respect to the diameter D of these bores 9, 10 the radial clearance should be at most 0.02, preferably at most 0.01 mm.

The welding area 11 is shown in FIGS. 3 and 4. Each welding 11 specifically connects one thermocouple wire 6, 7 to the periphery of the respective bores 9, 10. In a cross-section of a sensor 1 according to the invention these individual welding areas 11 of each thermocouple wire 6, 7 are clearly visible. Clearly, they extend beyond the predetermined processing depth L. If a front surface 3 is removed by a user up to a processing line B which is allowed to extend up to the processing depth L a secure connection of the thermocouple wires 6, 7 to the sensor tip 2 is still guaranteed. A single welding which adjoins the both spaced apart thermocouple wires 6, 7 in one single welding 11 would not be able to ensure the quality of the sensor 1.

To be able to insert the sensor 1 after the reworking by the user has been finished following a subsequent removal again in the same orientation the sensor 1 is preferably provided with a rotation lock 15.

A sensor 1 according to the invention of the type described above can also include a pressure sensor 16 and thus be manufactured as a combined temperature-pressure sensor.

LIST OF REFERENCE NUMERALS 1 sensor
2 sensor tip
3 front
4 tool inner wall
5 cavity
6 thermocouple wire
7 thermocouple wire
8 thermocouple
9 bore
10 bore
11 welding, welding area
12 tool
L processing depth
D diameter
B front line following a processing

The invention claimed is:

1. A temperature sensor having a sensor tip and a front surface for measuring temperatures of tool inner walls, and two thermocouple wires of a thermocouple wherein each of the thermocouple wires is guided in a respective bore defined in the sensor and at least one of the thermocouple wires is guided in its respective bore through the sensor tip up to the front surface, wherein each thermocouple wire guided to the front surface is welded to the sensor tip in a welding area up to a depth which is larger than a given minimum processing depth behind the front surface.

2. A sensor according to claim 1 wherein both thermocouple wires are guided to the front surface.

3. A sensor according to claim 1 wherein exactly one of the thermocouple wires is guided to the front surface and the other thermocouple wire is connected to the sensor tip at a site different from the front surface.

4. A sensor according to claim 3 wherein the sensor tip is made from the same material as the thermocouple wire which is not guided to the front surface.

5. A sensor according to claim 1 wherein the processing depth is at least 0.2 mm.

6. A sensor according to claim 1 wherein the welding is made without adding any additional material.

7. A sensor according to claim 1 wherein each thermocouple wire guided to the front surface is welded to the sensor tip individually.

8. A sensor according to claim 1 wherein the radial clearance of the thermocouple wire in the bore at the sensor tip is at most 0.02 mm in the diameter.

9. A sensor according to claim 1, further comprising a rotation lock for the insertion mechanism into the tool.

10. A sensor according to claim 1 wherein the sensor is a combined temperature-pressure sensor.

11. A sensor according to claim 1 wherein the processing depth is at least 0.5 mm.

12. A sensor according to claim 2 wherein the processing depth is at least 0.2 mm.

13. A sensor according to claim 2 wherein the processing depth is at least 0.5 mm.

14. A sensor according to claim 1 wherein the radial clearance of the thermocouple wire in the bore at the sensor tip is at most 0.01 mm in the diameter.

* * * * *